United States Patent
Jabori et al.

(10) Patent No.: US 10,090,712 B2
(45) Date of Patent: Oct. 2, 2018

(54) WIRELESS POWER ALIGNMENT

(71) Applicant: HEWLETT-PACKARD DEVELOPMENT COMPANY, L.P., Houston, TX (US)

(72) Inventors: Monji G Jabori, Houston, TX (US); Hui Leng Lim, Houston, TX (US); Charles J Stancil, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 45 days.

(21) Appl. No.: 15/030,278

(22) PCT Filed: Jan. 30, 2014

(86) PCT No.: PCT/US2014/013906
§ 371 (c)(1),
(2) Date: Apr. 18, 2016

(87) PCT Pub. No.: WO2015/116111
PCT Pub. Date: Aug. 6, 2015

(65) Prior Publication Data
US 2016/0336817 A1    Nov. 17, 2016

(51) Int. Cl.
*H02J 7/00*    (2006.01)
*H02J 7/14*    (2006.01)
*H02J 50/12*   (2016.01)
*H04M 1/725*   (2006.01)
*H02J 50/90*   (2016.01)
(Continued)

(52) U.S. Cl.
CPC ............. *H02J 50/12* (2016.02); *H02J 7/025* (2013.01); *H02J 7/042* (2013.01); *H02J 50/90* (2016.02); *H04M 1/72569* (2013.01); *H02J 7/0042* (2013.01)

(58) Field of Classification Search
USPC ....... 320/134, 135, 136, 107, 108, 109, 104, 320/111, 114, 115, 137, 112, 139
See application file for complete search history.

(56) References Cited

U.S. PATENT DOCUMENTS

2008/0111518 A1* 5/2008 Toya ................. H02J 7/0044
                                                      320/108
2008/0164844 A1* 7/2008 Kato ................. H01F 5/003
                                                     320/114
(Continued)

FOREIGN PATENT DOCUMENTS

CN    101841173    9/2010
CN    102386639    3/2012
(Continued)

OTHER PUBLICATIONS

Gilson; "Qi Wireless Charging Explained", Sep. 6, 2012.
Rose; "LG Announces Its Wireless Charging Pad for Mobile Phones", Mar. 23, 2011.

*Primary Examiner* — Alexis Pacheco
(74) *Attorney, Agent, or Firm* — HPI Patent Department

(57) ABSTRACT

A computing device can include a wireless power module and a haptic module to move the computing device in a direction. A controller in the computing device can detect a misalignment of the wireless power module with a wireless power transmitter. The controller can control the haptic module to move the computing device to be aligned with the wireless power transmitter.

13 Claims, 5 Drawing Sheets

(51) Int. Cl.
*H02J 7/02* (2016.01)
*H02J 7/04* (2006.01)

(56) References Cited

U.S. PATENT DOCUMENTS

| | | | | |
|---|---|---|---|---|
| 2010/0156344 A1* | 6/2010 | Inoue | ............... | H02J 5/00 |
| | | | | 320/108 |
| 2010/0237827 A1* | 9/2010 | Sip | ............... | H02J 50/90 |
| | | | | 320/108 |
| 2012/0052923 A1* | 3/2012 | Park | ............... | H01M 10/44 |
| | | | | 455/567 |
| 2012/0112553 A1* | 5/2012 | Stoner, Jr. | ............... | H02J 5/005 |
| | | | | 307/104 |
| 2012/0146426 A1* | 6/2012 | Sabo | ............... | H02J 50/40 |
| | | | | 307/104 |
| 2012/0187903 A1* | 7/2012 | Tabata | ............... | H02J 7/025 |
| | | | | 320/108 |
| 2012/0200254 A1* | 8/2012 | Yoon | ............... | H02J 7/025 |
| | | | | 320/108 |
| 2013/0069431 A1* | 3/2013 | Tseng | ............... | H02J 7/0044 |
| | | | | 307/43 |
| 2013/0088195 A1 | 4/2013 | Yoon et al. | | |
| 2013/0113423 A1* | 5/2013 | Baarman | ............... | H01F 38/14 |
| | | | | 320/108 |
| 2013/0278210 A1 | 10/2013 | Cook et al. | | |
| 2014/0015493 A1 | 1/2014 | Wirz | | |
| 2014/0031904 A1* | 1/2014 | Mashiach | ............... | A61N 1/0558 |
| | | | | 607/62 |
| 2014/0091758 A1* | 4/2014 | Hidaka | ............... | H01F 38/14 |
| | | | | 320/108 |
| 2015/0357862 A1* | 12/2015 | Saari | ............... | H02J 7/025 |
| | | | | 340/10.5 |

FOREIGN PATENT DOCUMENTS

WO  PCT-2012/169861 A    12/2012
WO  PCT-2013/054232 A1    4/2013

* cited by examiner

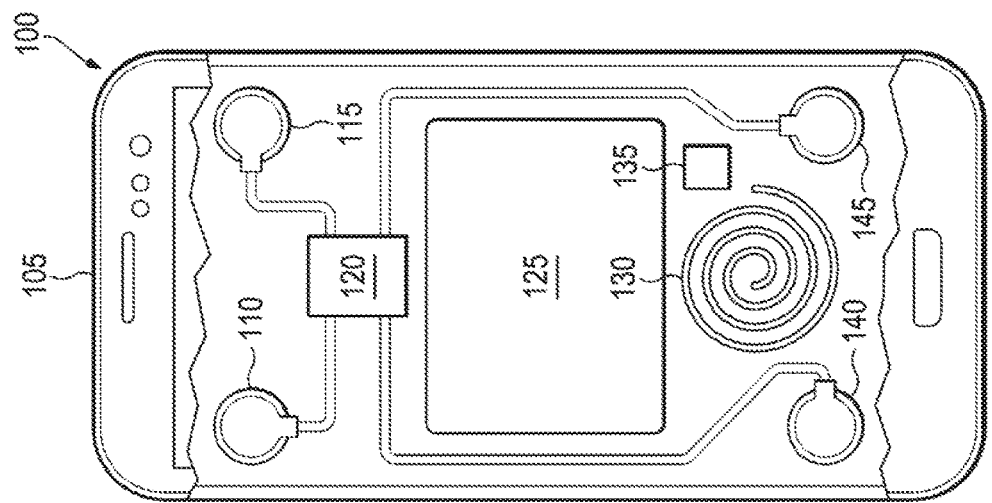
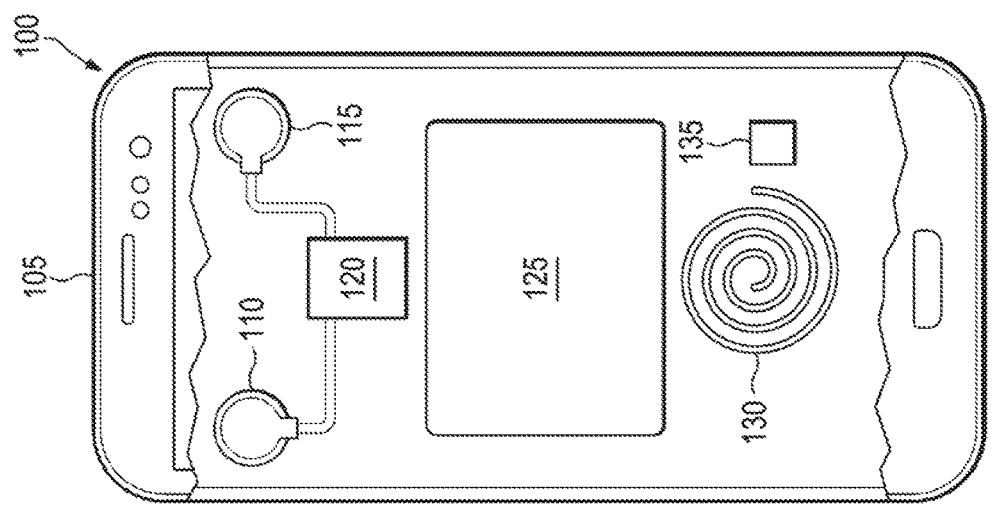
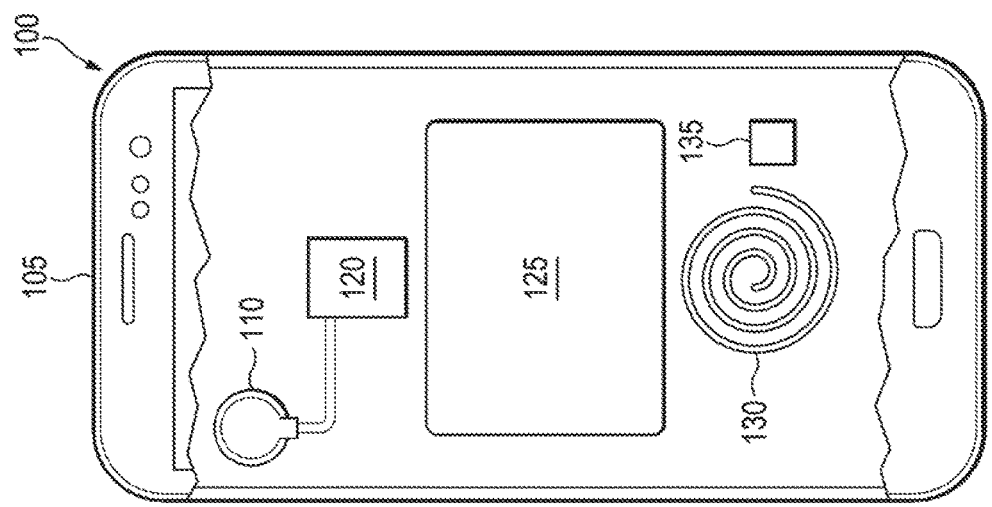

WIRELESS POWER ALIGNMENT

BACKGROUND

Haptic technology is tactile feedback which takes advantage of the sense of touch by applying forces, vibrations, or motions to the user. This mechanical stimulation can be used to assist in the creation of virtual objects in a computer simulation, to control such virtual objects, and to enhance the remote control of machines and devices. Haptic feedback may use electromagnetic technologies such as vibratory motors.

BRIEF DESCRIPTION OF THE DRAWINGS

Some embodiments of the invention are described with respect to the following figures:

FIG. 1 is a computing device according to an example implementation;

FIG. 2 is a computing device according to an example implementation;

FIG. 3 is a computing device according to an example implementation;

DETAILED DESCRIPTION

Figure 4:
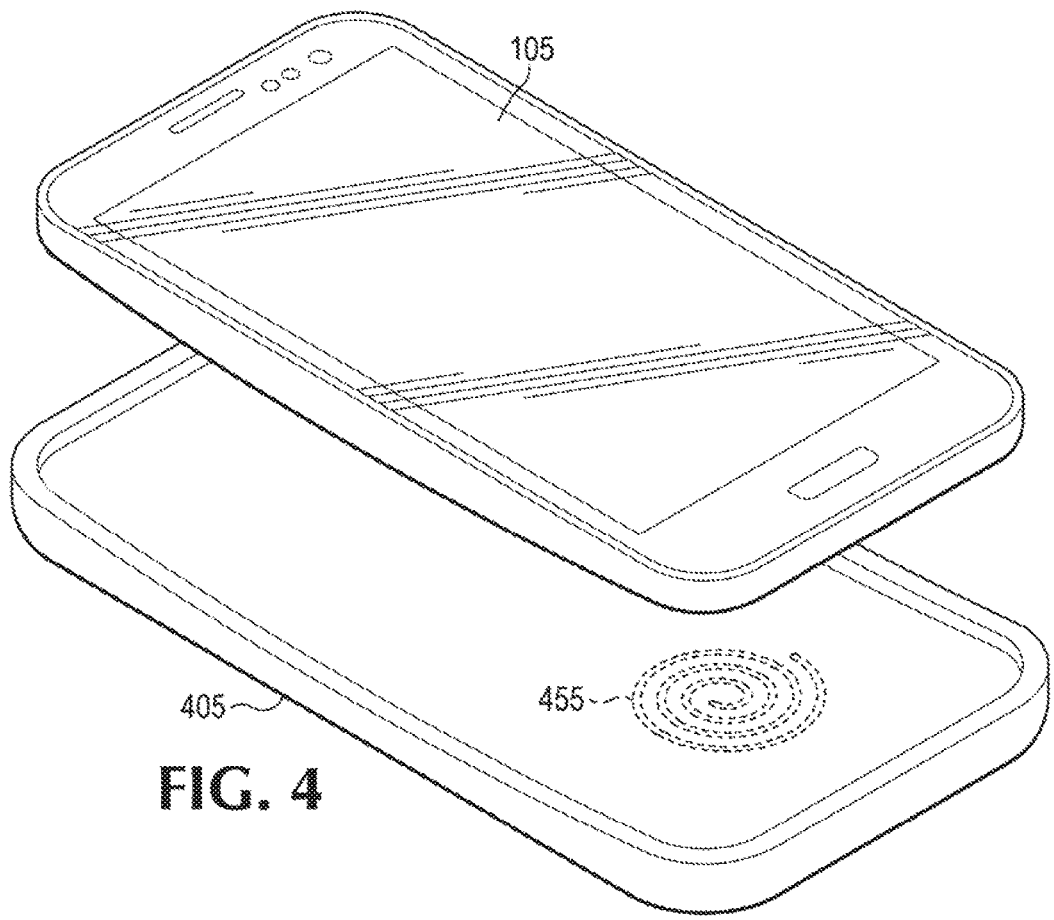
FIG. 4 is a computing device and wireless power transmitter according to an example implementation.

Wireless power transfer such as by induction can transfer power from a wireless power transmitter to a wireless power module. The wireless power module may be on a computing device to power the device or transfer power to a storage on the computing device such as a battery.

The efficiency of transfer of power by induction may be effected by the alignment of the inductive coils. Haptics is a tactile feedback technology which takes advantage of the sense of touch by applying forces, vibrations, or motions to the user. A computing device may include a haptic module, the haptic module may cause the computing device to vibrate. Vibration of the computing device can cause the computing device to move relative to a wireless power transmitter causing the computing device to align with wireless power transmitter to increase the efficiency of the power transfer.

In one implementation, a computing device can include a wireless power module and a haptic module to move the computing device a direction. A controller in the computing device can detect a misalignment of the wireless power module with a wireless power transmitter. The controller can control the haptic module to move the computing device to be aligned with the wireless power transmitter.

In another implementation, a method can include sensing, by a computing device, a wireless power module misaligned with a wireless transmitter. Then a controller can determine if activating a haptic module would align the wireless power module with the wireless power transmitter. If they would align the haptic module can be activated until the wireless power module is aligned with the wireless power transmitter.

In still another implementation, a computer readable medium can include code that if executed by a controller in a computing device can cause the controller to determine if a wireless power module and a wireless power transmitter are misaligned. The code can then cause the controller to determine if activating a haptic module would align the wireless power module with the wireless power transmitter. The controller can then activate the haptic module if it is determined that activating the haptic module would align the wireless power module with the wireless power transmitter with the wireless power module is aligned with the wireless power transmitter.

With reference to the figures, FIG. 1 is a computing device according to an example implementation. A computing device 100 can include an enclosure 105 and a wireless power module 130. The enclosure 105 may be made of a plastic, carbon fiber, metal or another material. If conductive material is used for the enclosure 105, a non-conductive material may be part of the enclosure 105 to allow wireless power to be received through the non-conductive part of the enclosure 105. The material of the enclosure may have a low co-efficient of friction created between the enclosure and another material such as below 0.6.

A haptic module 110 can move the computing device in a direction by vibrating the computing device 100. The haptic module may be for example an eccentric rotating mass (ERM), a linear resonance actuator (LRA), a piezo actuator or another type of haptic module. The vibrations caused by the haptic module 110 may be linear, periodic, random or transient, the result of the vibrations can be to move the computing device in a direction. A controller 120 can determine how to activate the haptic module 110 to move the computing device 100 in a direction and a distance. For example the direction may be any direction from 0 and 360 degrees. The amount of movement of the computing device 100 provided by activating the haptic module 110 may depend on many factors such as the weight of the computing device 100, the force generated by the haptic module 110 and the coefficient of friction between the computing device 100 and the wireless power transmitter which may be in a docking station for example. The controller 120 can also affect the motion and direction by the type and frequency of the input waveform to the haptic module 110.

The controller 120 can detect a misalignment of the wireless power module 130 with a wireless power transmitter. The wireless power transmitter can send power to a wireless power module. The wireless power module can receive power from the wireless power transmitter. The wireless power transmitter may be the primary coil of an electrical transformer and the wireless power module may be the secondary coil of an electrical transformer. The distance that power can be transferred between a primary and secondary coil of an electrical transformer may be short. To extend the distance that power can be transferred between the wireless power transmitter and the wireless power module resonant inductive coupling can be used where the primary and secondary coils are tuned to resonate at the same frequency.

The detection may be by receiving data from a sensor 135. The sensor 135 may for example detect a magnetic field in the wireless power transmitter and the sensor 135 may detect the magnet's position relative to the sensor. The controller 120 can use the data from the sensor 135 to determine a direction and a distance to move the computing device 100 and therefore the wireless power module 130 relative to the wireless power transmitter. The controller 120 may have a threshold limit on the distance that the computing device 100 can be moved to align the wireless power module 130 with the wireless power transmitter for example a threshold may be 0.5 centimeters although other thresholds can be used. if for example the controller 120 determines that the wireless power module 130 is 0.7 centimeters out of alignment and the threshold is 0.5 centimeters the controller may not activated the haptic module 110, however if the controller determined the wireless power module 130 was 0.3 centimeters out of alignment with the wireless power transmitter then the controller may activate the haptic module to start vibrating the computing device 100 causing the wireless power module 130 to become more aligned with the wireless power transmitter.

A battery 125 can store the energy received from the wireless power module 130. The battery 125 may be a lithium ion, nickel metal hydride or another battery technology. The battery 125 may be charged by receiving current from the wireless power module 130. Other components in the computing device 100 can be powered by the wireless power module 130 by receiving current from the wireless power module 130 or from the battery 125.

Aligning the wireless power module 130 with a wireless power transmitter can improve the efficiency of the power transfer between the wireless power transmitter and the wireless power module 130. For example if the wireless power module 130 is 0.5 centimeters out of alignment the efficiency may drop over 50% from an aligned wireless power module 130 and a wireless power transmitter. An aligned wireless power module 130 with a wireless power transmitter may be when the wifeless power module 130 is within a threshold distance such as 0.1 centimeters from the wireless power transmitter. Although the thresholds have been described as distances the thresholds may be other values such as the electrical current received from the wireless power module 130 or the charging efficiency. For example if the electrical current is below a threshold the computing device 100 may be moved to increase the current received or if the efficiency is below a threshold amount the computing device 100 may be moved. The maximum efficiency may be about 72% for a wireless power module and wireless power transmitter however misalignment can reduce the charging efficiency.

FIG. 2 is a computing device according to an example implementation. The haptic module may include a first haptic module 110 and a second haptic module 115. The first haptic module 110 and the second haptic module may be oriented in different directions relative to each other to produce movement of the computing device 100 in different directions. For example the second haptic module 115 may be substantially perpendicular to the first haptic module 110. The first haptic module 110 and second haptic module 115 may be controlled to move the computing device 100 in more than one direction. The haptic modules 110 and 115 may have motors or other components that can be operated in for example a forward and reverse direction. Operating the haptic module in forward may cause the computing device to move in a one direction while operating the haptic module in reverse may cause the computing device to move in another direction.

The haptic modules 110 and 115 can also provide feedback for events. For example the controller 120 may cause the haptic module 110 to vibrate when a phone call, a text message or another event occurs. The controller 120 may operate the haptic modules 110 and 115 in a way that causes the device not to move in a direction to prevent any event from causing the loss of efficiency of the wireless power module 130. The controller 120 in one example may not operate the haptic modules for indicating an event if wireless charging is occurring to prevent the haptic modules from moving the computing device 100 out of alignment with the wireless power transmitter.

FIG. 3 is a computing device according to an example implementation. In one example computing device 100 includes multiple haptic modules. The first haptic module 110, the second haptic module 115, the third haptic module 140 and the fourth haptic module 145 are shows as being toward the corners of the computing device 100 but may be in other configurations. The controller 120 can cause the haptic modules 110, 115, 140, and 145 to operate in coordination to move the computing device 100. For example when operated each haptic module may pull the device in the direction leading with that corner. If haptic modules on the same side such as haptic modules 115 and 145 are activated the computing device may move to the side. The haptic modules 110, 115, 140, and 145 may also cause the computing device to rotate for example.

Figure 5:
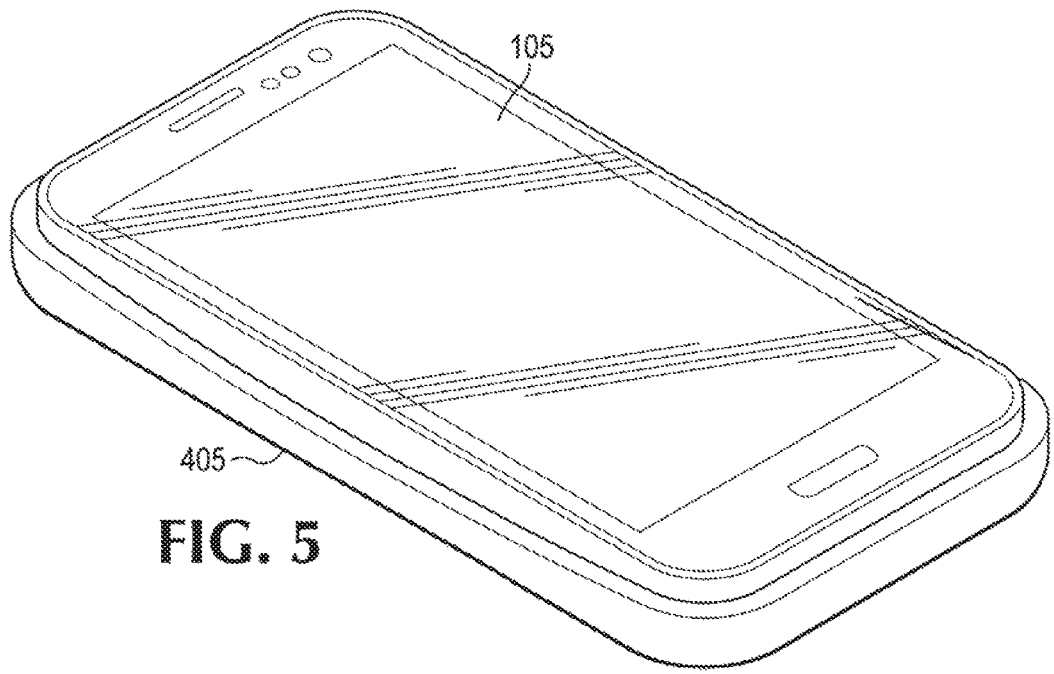
FIG. 5 is a computing device and wireless power transmitter according to an example implementation.

FIG. 4-5 are a computing device and wireless power transmitter according to example implementation. In some examples the enclosure 105 and a docking station 405 may have a shape that promotes the alignment caused by the haptic modules to align the wireless power transmitter 455 with the wireless power module 130. One example of such a shape is the computing device enclosure 105 has a convex shape and the docking station 405 includes concave shape. In one example the computing device enclosure 105 and the docking station can be shaped so that the computing device enclosure 106 can settle into an aligned position by activating the haptic module when the computing device detects that it is out of alignment with the docking station. Although FIGS. 4-5 show a concave and convex shape of the docking station 405 and the computing device 105 other shapes may be used such as alignment protrusions on the computing device enclosure 105 that align with alignment indentations on the docking station 405 when the haptic module is activated. Using alignment features of the enclosure and the docking station may allow the haptic module to be operated when there is misalignment without having to use the controller to control the direction or distance of movement of the computing device enclosure 105 relative to the docking station 450. For example if the computing device enclosure 105 is in contact with the docking station 405 as shown in FIG. 5 and the wireless power module within the computing device enclosure 105 is not aligned for maximum efficiency the controller can activate the haptic module and the weight of the computing device will cause the computing device to move along the surface of the docking station until the computing device enclosure 105 is aligned with the docking station 405.

The docking station 405 may provide the wireless power transmitter 455. The docking station 405 may receive power for the wireless power transmitter 455 from are alternating current (AC) to direct current (DC) adapter such as a 5 watt adapter. The DC current may be converted back to AC current that is applied to the wireless power transmitter 455. The wireless power module can generate AC current that is converted to DC current in the computing device for use to charge the battery or power the components of the computing device. The docking station 405 may also have other components for data communication with the computing device 100 such as Bluetooth or wifi wireless data transceivers.

Figure 6:
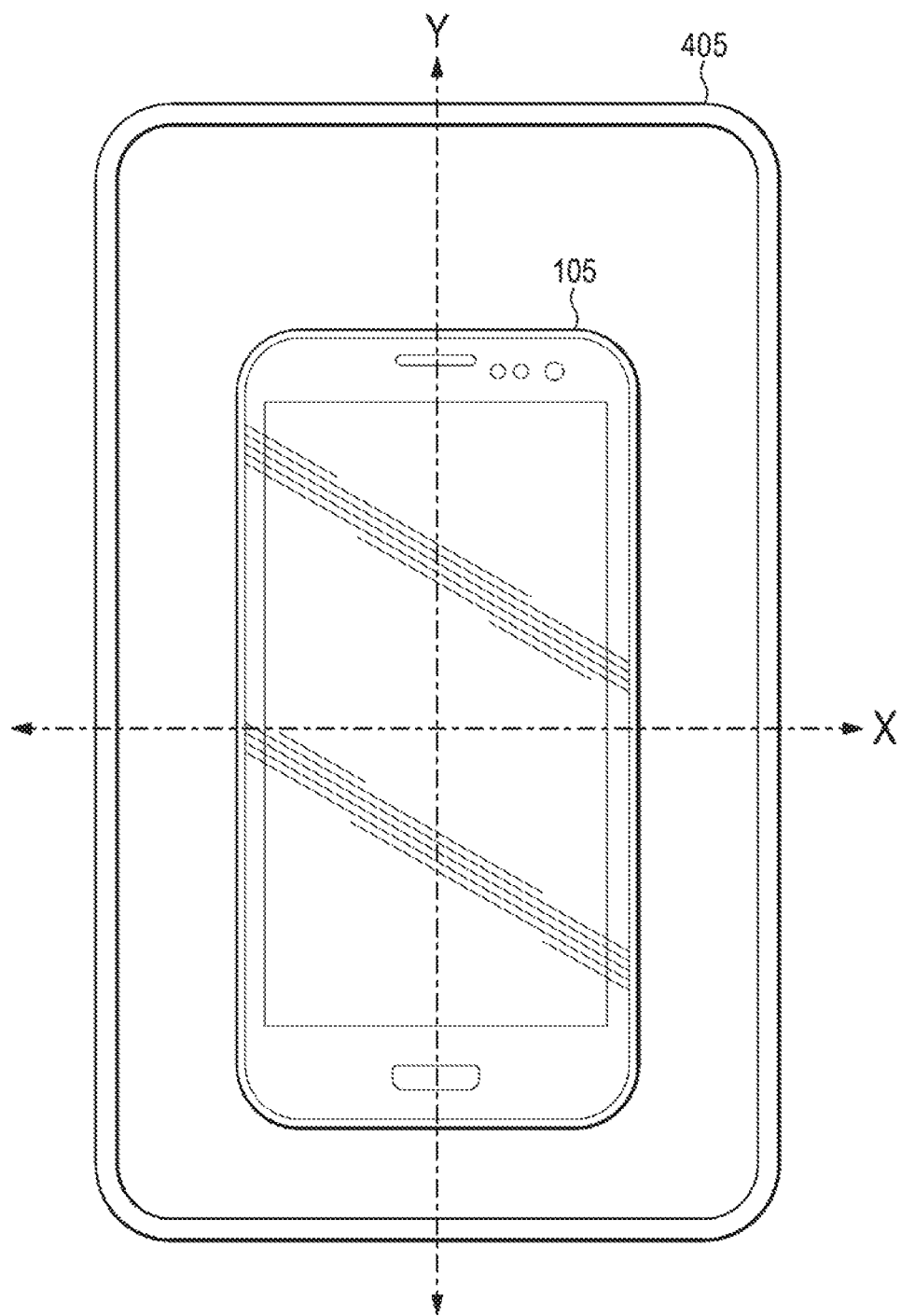
FIG. 6 is a computing device and wireless power transmitter according to an example implementation.

FIG. 6 is a computing device and wireless power transmitter according to an example implementation. The computing device enclosure 105 is on the docking station 405 and the computing device enclosure 105 is shown moving in the x direction to the middle of the docking station. The haptic modules may also cause the computing device to move in the Y direction.

Figure 7:
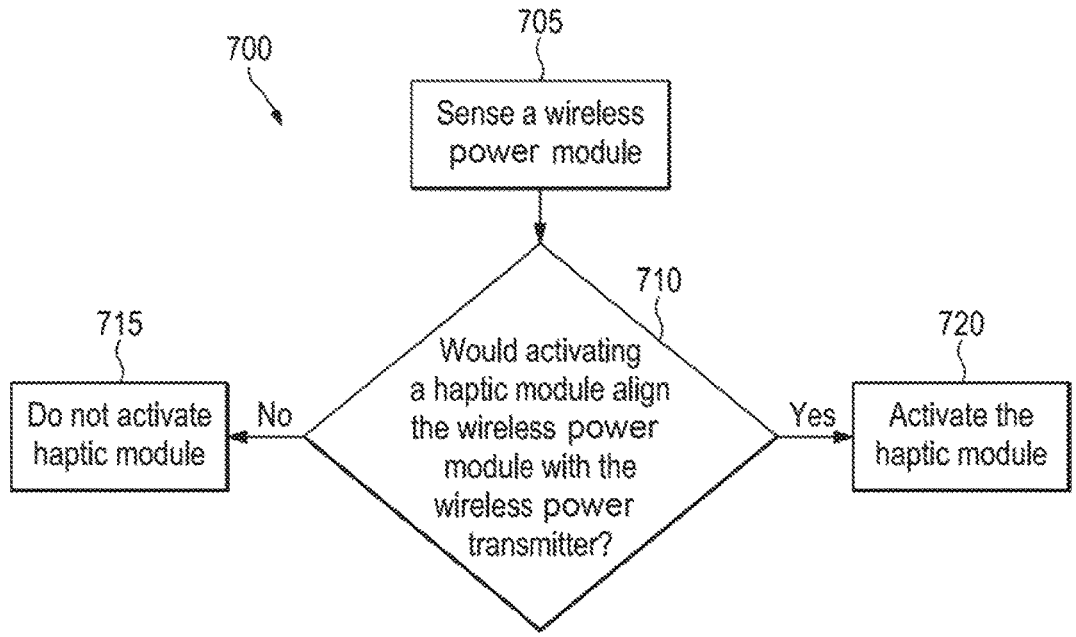
FIG. 7 is a flow chart of a method of aligning a wireless power module according to an example implementation.

FIG. 7 is a flow chart of a method of aligning a wireless power module according to an example implementation. The method 700 includes sensing, by a computing device 100, a wireless power module misaligned with a wireless power transmitter at 705. It can be determined from using a controller if activating a haptic module would align the wireless power module with the wireless power transmitter at 710. If it is determined that activating the haptic module would align the wireless power module with the wireless power transmitter then the haptic module can be activated until the wireless power module is aligned with the wireless power transmitter at 720. If it is determined that activating the haptic module would not align the wireless power module with the wireless power transmitter then the haptic module is not activating at 715. If the haptic module is not activated to align the wireless power module with the wireless power transmitter then the computing device may notify the user that the haptic module cannot align the wireless power module with the wireless power transmitter. The notification may also prompt the user with instructions in how to move the device so that it is within a threshold that the haptic module can be used to align wireless power module with the wireless power transmitter, for example the notification may ask to reposition the device docking station, or may have an arrow showing which way to move the computing device.

In an implementation it may be determined that the wireless power module misalignment is greater than a threshold limit. Other examples may include that the controller determines that there is not enough power to move the computing device at current levels. If for example the current power level is not enough to align the wireless power module with the wireless power transmitter then the controller may delay activating the haptic modules until power in a storage such as a battery has reached sufficient levels to allow then haptic modules to be activated.

Figure 8:
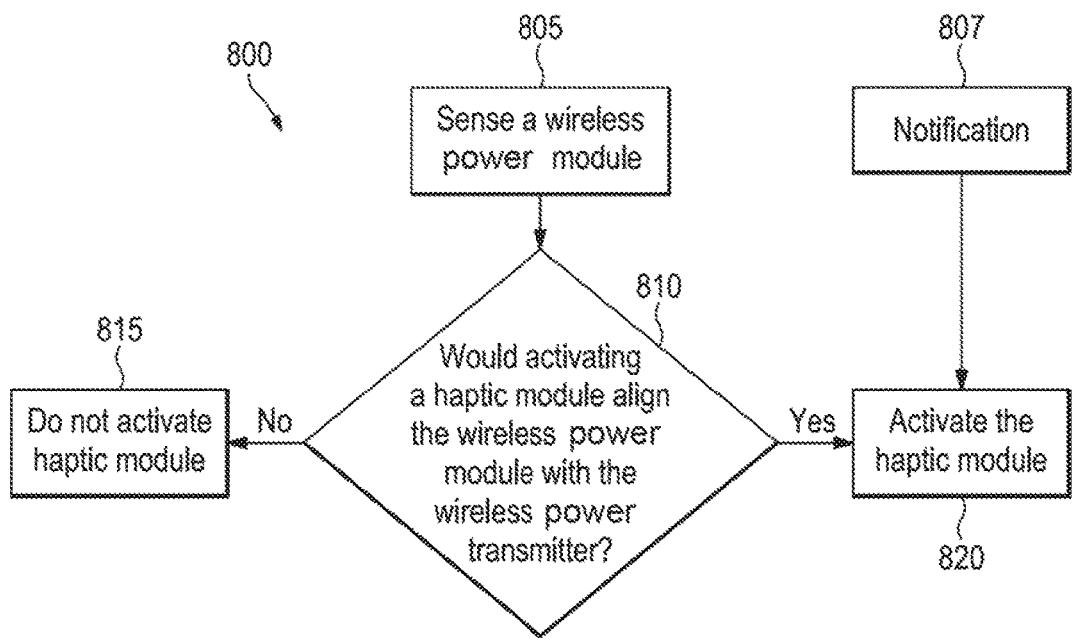
FIG. 8 is a flow chart of a method of aligning a wireless power module according to an example implementation.

FIG. 8 is a flow chart of a method of aligning a wireless power module according to an example implementation. The method 800 includes sensing, by a computing device 100, a wireless power module misaligned with a wireless power transmitter at 805. It can be determined from using a controller if activating a haptic module would align the wireless power module with the wireless power transmitter at 810. If it is determined that activating the haptic module would align the wireless power module with the wireless power transmitter then activating the haptic module until the wireless power module is aligned with the wireless power transmitter at 820. The determination at 820 may include comparing the misalignment to a first threshold.

If it is determined that activating the haptic module would not align the wireless power module with the wireless power transmitter then no activating the haptic module at 815.

A notification generated at 807 may also cause the haptic module to be activated at 820. The notification may be for example a phone call being received, text message or another notification.

Figure 9:
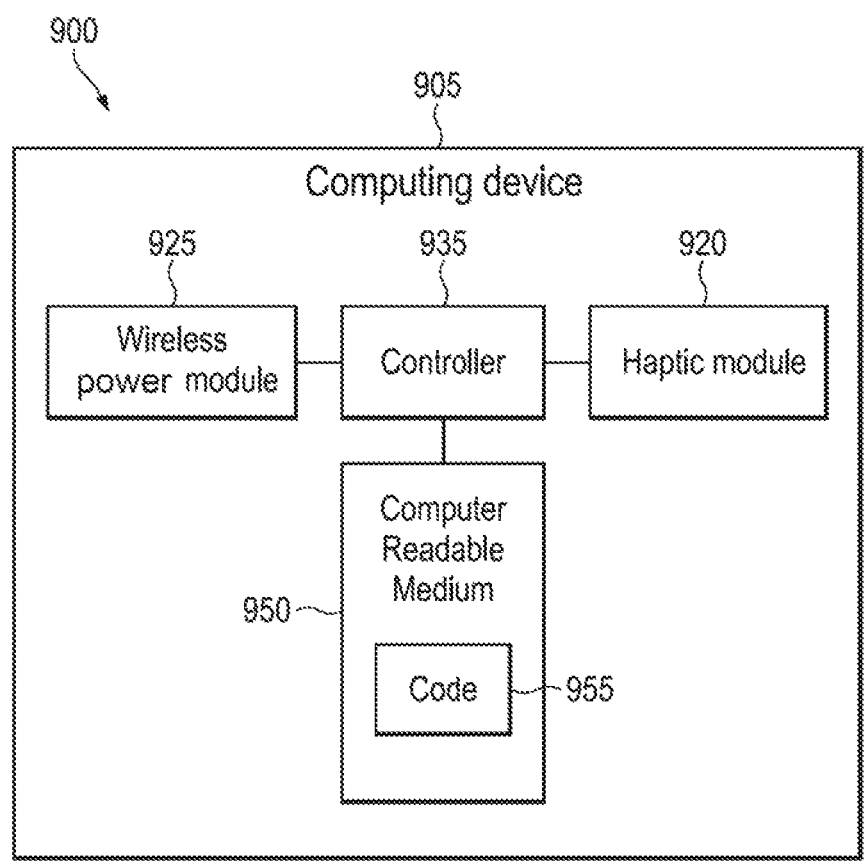
FIG. 9 is a computing device according to an example implementation.

FIG. 9 is a computing device according to an example implementation. The computing device 900 can include an enclosure 905 and a computer readable medium 950. The computer readable medium 950 can include code 955 that if executed by a controller 935 in a computing device 900 causes the controller 935 to determine if a wireless power module 925 and a wireless power transmitter are misaligned. It is determined if activating a haptic module 920 would align the wireless power module with the wireless power transmitter. The controller can then activate the haptic module if it is determined that activating the haptic module would align the wireless power module with the wireless power transmitter until the wireless power module is aligned with the wireless power transmitter. To determine if activating the haptic module would align the wireless power module 925 and a wireless power transmitter the misalignment can be compared to a range between a first threshold and a second threshold.

The techniques described above may be embodied in a compute medium for configuring a computing system to execute the method. The computer readable media may include, for example and without limitation, any number of the following non-transitive mediums: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories: volatile storage media including registers, buffers or caches, main memory, RAM, etc.; and the Internet, just to name a few. Other new and various types of computer-readable media may be used to store the software modules discussed herein. Computing systems may be found in many forms including but not limited to mainframes, minicomputers, servers, workstations, personal computers, notepads, personal digital assistants, various wireless devices and embedded systems, just to name a few.

The use of "comprising", "including" or "having" are synonymous and variations thereof herein are meant to be inclusive or open-ended and do not exclude additional unrecited elements or method steps. it should also be noted that a plurality of hardware and software based devices, as well as a plurality of different structural components may be used to implement the disclosed methods and systems.

In the foregoing description, numerous details are set forth to provide a understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:
1. A computing device comprising;
a wireless power module;
a sensor to detect a direction and an amount of a misalignment with an object in a wireless power transmitter;
a haptic module to move the computing device in by the amount and in the direction; and
a controller to compare the amount of the misalignment to a threshold and to control the haptic module to move the computing device by the amount and in the direc- tion to be aligned with the wireless power transmitter when the amount of the misalignment is below the threshold.

2. The device of claim 1, wherein the controller does not control the haptic module to move the computing device when the amount of misalignment is above the threshold.

3. The device of claim 2, wherein the threshold is a distance.

4. The device of claim 1, further comprising alignment protrusions on the computing device.

5. The device of claim 4, further comprising alignment indentations on the wireless power transmitter.

6. The device of claim 1, wherein the haptic module includes a first haptic module and a second haptic module substantially perpendicular to the first haptic module.

7. The device of claim 1, wherein the computing device has a convex shape and the wireless power transmitter includes concave shape.

8. The device of claim 1, further comprising a sensor to detect misalignment with an object in a wireless power transmitter.

9. The device of claim 1, wherein the haptic module provides feedback for events.

10. A method comprising:
   sensing, by a computing device, a direction and an amount of a misalignment between a wireless power module and a wireless power transmitter;
   comparing, by a controller, the amount of misalignment from the sensing to a threshold;
   determining, by the controller, that the amount of the misalignment is below the threshold; and
   activating, by the controller, a haptic module to align the wireless power module with the wireless power transmitter until the wireless power module is aligned with the wireless power transmitter.

11. The method of claim 10, further comprising activating the haptic module in response to a notification event.

12. A computer readable medium comprising code that when executed by a controller in a computing device causes the controller to:
   determine a direction and an amount of a misalignment between a wireless power module and a wireless power transmitter;
   compare the amount of misalignment to a threshold;
   determine that the amount of misalignment is below the threshold; and
   activate a haptic module to align the wireless power module with the wireless power transmitter until the wireless power module is aligned with the wireless power transmitter.

13. The computer readable medium of claim 12 further comprising code that when executed causes the computing device to:
   compare a misalignment to a range between the threshold and a second threshold.

* * * * *